United States Patent [19]
Maturi et al.

[11] Patent Number: 5,559,999
[45] Date of Patent: Sep. 24, 1996

[54] MPEG DECODING SYSTEM INCLUDING TAG LIST FOR ASSOCIATING PRESENTATION TIME STAMPS WITH ENCODED DATA UNITS

[75] Inventors: Greg Maturi, Tracy; David R. Auld; Darren Neuman, both of San Jose, all of Calif.

[73] Assignee: LSI Logic Corporation, Milpitas, Calif.

[21] Appl. No.: 303,444

[22] Filed: Sep. 9, 1994

[51] Int. Cl.$^6$ ................................. G06F 13/372
[52] U.S. Cl. ......................... 395/550; 348/7; 348/10; 370/94.2; 370/110.1; 395/182.18; 395/200.17
[58] Field of Search ................ 395/200.17, 550, 395/182.18, 250; 348/7, 512, 10; 370/110.1, 94.2

[56] References Cited

U.S. PATENT DOCUMENTS

| | | | |
|---|---|---|---|
| 4,241,398 | 12/1980 | Carll | 395/200.17 |
| 5,287,182 | 2/1994 | Haskell et al. | 348/500 |
| 5,396,497 | 3/1995 | Veltman | 370/100.1 |
| 5,442,390 | 8/1995 | Hooper et al. | 348/7 |
| 5,448,568 | 9/1995 | Delpuch et al. | 372/94.2 |

*Primary Examiner*—Ken S. Kim
*Attorney, Agent, or Firm*—Poms, Smith, Lande & Rose

[57] ABSTRACT

A Motion Picture Experts Group (MPEG) multiplexed data bitstream includes encoded video and audio data units, which are prefixed with headers including Presentation Time Stamps (PTS) indicating desired presentation times for the respective data units. The data units are decoded, and presented at a fixed time after decoding, such that the fixed time can be subtracted from the PTS to provide a desired decoding time. The bitstream is parsed, the video and audio headers are stored in video and audio header memories, and the associated video and audio data units are stored in video and audio channel memories respectively. A first interrupt is generated each time a header is stored, and a host microcontroller responds by storing the PTS from the header and the starting address of the corresponding data unit in the channel memory as an entry in a list. A second interrupt is generated each time a data unit is decoded, and the host microcontroller responds by accessing the list using the starting address of the data unit to obtain the corresponding PTS and thereby the desired decoding time. Decoding and presentation are synchronized by comparing the desired decoding time with a system clock time. If the desired decoding time is later than the system clock time by more than one presentation (frame) time period for the data unit, presentation of the data unit is skipped. If the desired decoding time is earlier than the system clock time by more than the presentation time period, presentation of the data unit is repeated.

26 Claims, 4 Drawing Sheets

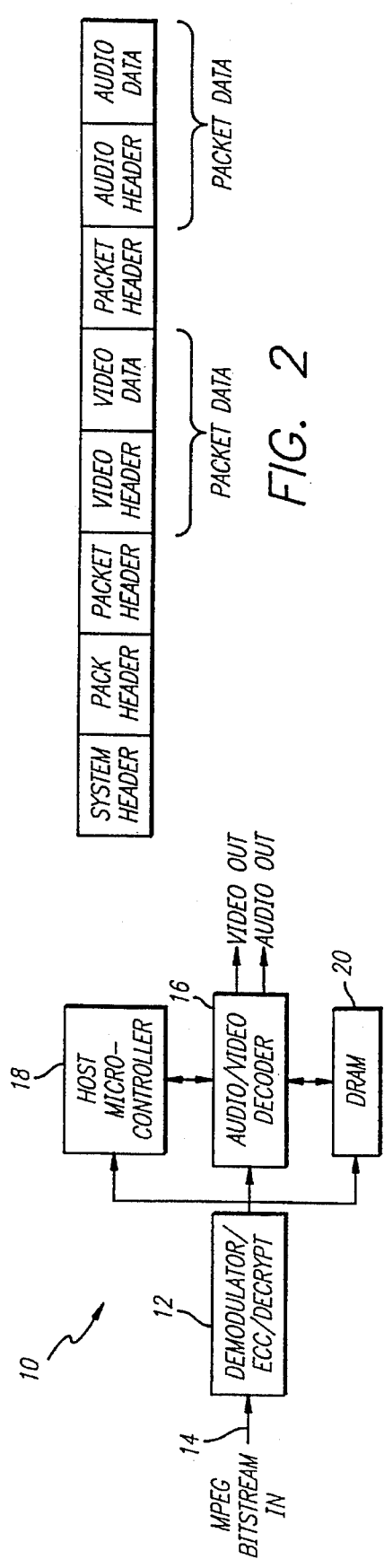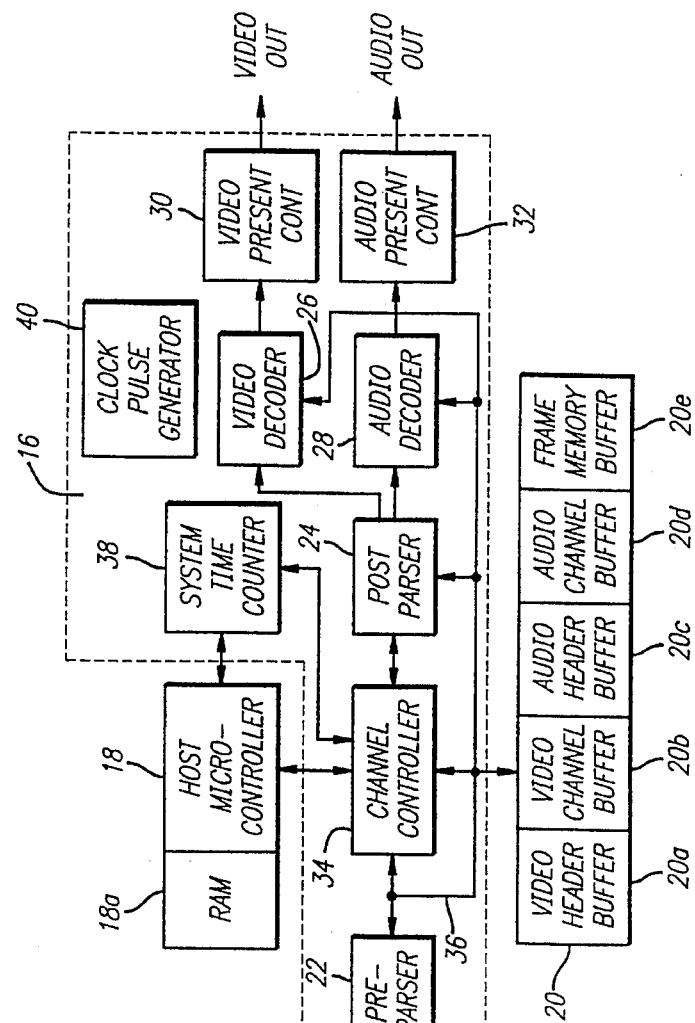

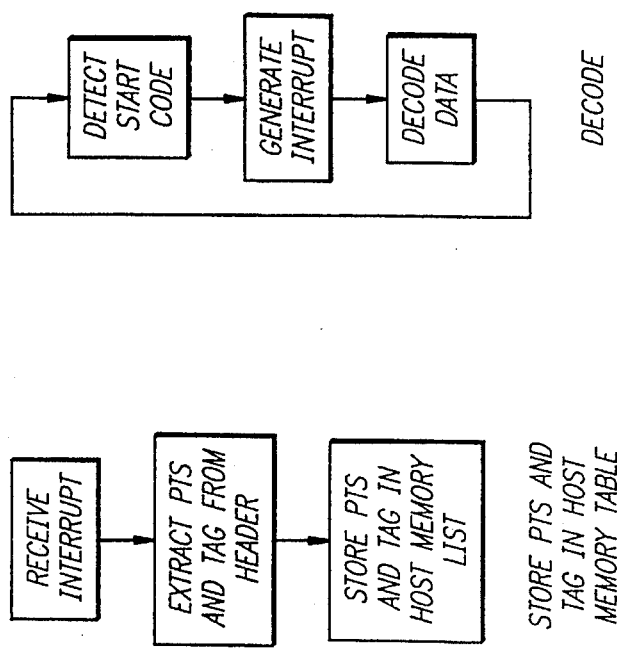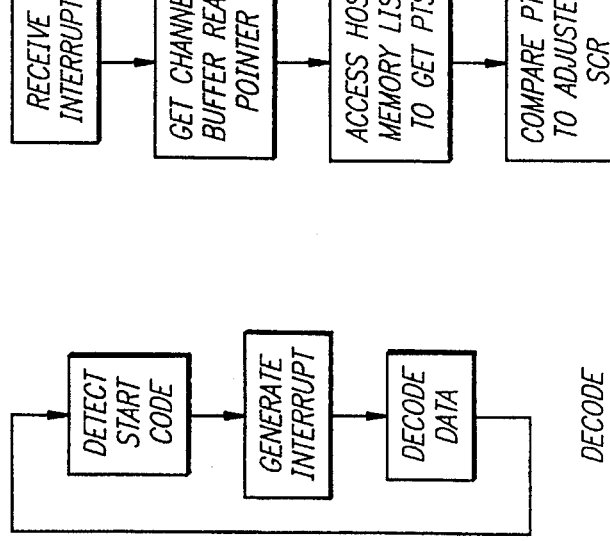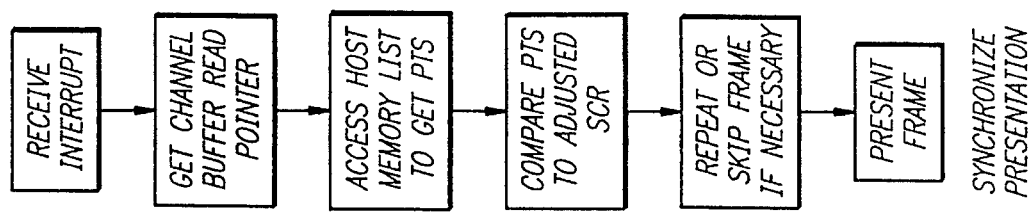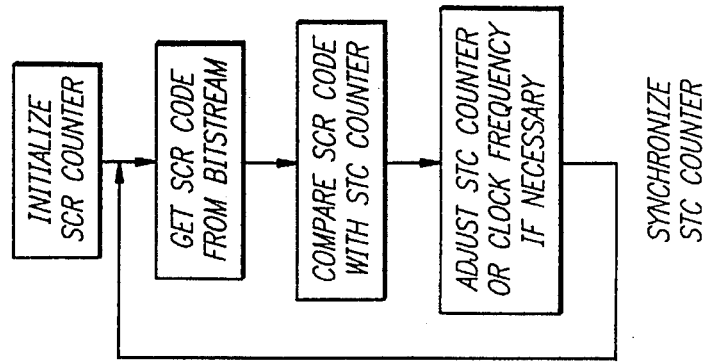

MPEG DECODING SYSTEM INCLUDING TAG LIST FOR ASSOCIATING PRESENTATION TIME STAMPS WITH ENCODED DATA UNITS

BACKGROUND OF THE INVENTION

1. Field of the Invention

The present invention generally relates to the art of audio/video data compression and transmission, and more specifically to a synchronization system for a Motion Picture Experts Group (MPEG) audio/video decoder.

2. Description of the Related Art

Constant efforts are being made to make more effective use of the limited number of transmission channels currently available for delivering video and audio information and programming to an end user such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels provides cost reduction and increased broadcast capacity.

The number of separate channels that can be broadcast within the currently available transmission bandwidth can be increased by employing a process for compressing and decompressing video signals. Video and audio program signals are converted to a digital format, compressed, encoded and multiplexed in accordance with an established compression algorithm or methodology.

The compressed digital system signal, or bitstream, which includes a video portion, an audio portion, and other informational portions, is then transmitted to a receiver. Transmission may be over existing television channels, cable television channels, satellite communication channels, and the like. A decoder is provided at the receiver to demultiplex, decompress and decode the received system signal in accordance with the compression algorithm. The decoded video and audio information is then output to a display device such as a television monitor for presentation to the user.

Video and audio compression and encoding is performed by a suitable encoders which implement a selected data compression algorithm that conforms to a recognized standard or specification agreed to among the senders and receivers of digital video signals. Highly efficient compression standards have been developed by the Moving Pictures Experts Group (MPEG), including MPEG 1 and MPEG 2. The MPEG standards enable several VCR-like viewing options such as Normal Forward, Play, Slow Forward, Fast Forward, Fast Reverse, and Freeze.

The MPEG standards outline a proposed synchronization scheme based on an idealized decoder known as a Standard Target Decoder (STD). Video and audio data units or frames are referred to as Access Units (AU) in encoded form, and as Presentation Units (PU) in unencoded or decoded form. In the idealized decoder, video and audio data presentation units are taken from elementary stream buffers and instantly presented at the appropriate presentation time to the user. A Presentation Time Stamp (PTS) indicating the proper presentation time of a presentation unit is transmitted in an MPEG packet header as part of the system syntax.

The presentation time stamps and the access units are not necessarily transmitted together since they are carried by different layers of the hierarchy. It is therefore necessary for the decoder to associate the presentation time stamp found at the packet layer with the beginning of the first access unit which follows it.

The situation is further complicated by the fact that in a real decoder the system has little control over the presentation times of the presentation units. For example, in the video decoder, video frames (pictures) must be presented at an exact multiple of the frame rate for the video to appear smooth, and the audio frames must be presented at exact multiples of the audio frame rate for the audio be free of clicks.

In the idealized MPEG synchronization scheme, a system time clock (STC) which maintains a system clock time is provided in the decoder. The initial value of the system clock time is transmitted in the system stream by the encoder as a System Clock Reference (SCR) in an MPEG 1 bitstream, or as a Program Clock Reference (PCR) in an MPEG 2 bitstream. The decoder sets its local system time clock to the initial value, and then continues to increment it at a clock rate of 90 kHz.

Subsequently, the encoder transmits a presentation time stamp for an audio or video access unit, followed some time later by the access unit itself. The decoder compares the presentation time stamp to the local system clock time, and when they are equal removes the access unit from the elementary stream buffer, instantly decodes it to produce the corresponding presentation unit, and presents the presentation unit.

In a real system, synchronization is complicated by factors including the following.

1. Presentation units cannot be removed from the elementary stream buffer instantaneously, nor decoded or presented instantaneously.

2. Acceptable presentation unit boundaries may not be under the control of the encoder. For example if an MPEG decoder is locked to an external television synchronization signal, the presentation unit boundaries are controlled by the synchronization pulse generator, not the decoder itself. This creates error in the presentation time.

3. Presentation time stamps which have errors in them, due to channel errors, and may prevent a frame from being decoded indefinitely.

SUMMARY OF THE INVENTION

The present invention provides a decoding system for a Motion Picture Experts Group (MPEG) multiplexed audio/video bitstream, or a comparable bitstream utilizing a different compression algorithm. The system incorporates a host microcontroller, a decoder, and an video/audio decoding synchronization method that is performed automatically by the system.

The MPEG bitstream includes encoded video and audio data or Access Units (AU) in the form of Packetized Elementary Streams (PES), which are prefixed with headers including Presentation Time Stamps (PTS) indicating desired presentation times for the respective access units. The access units are decoded to produce corresponding Presentation Units (PU), and presented at a fixed time after decoding, such that the fixed time can be subtracted from the presentation time stamps to provide requested decoding times.

The bitstream is parsed, the video and audio headers are stored in video and audio header memories, and the associated video and audio access units are stored in video and audio channel memories respectively. A first interrupt is generated each time a header is stored, and a host microcontroller responds by storing the presentation time stamp from the header and the starting address (write pointer) of the corresponding access unit in the channel memory as an entry in a list.

A second interrupt is generated each time an access unit is decoded, and the host microcontroller responds by accessing the list using the starting address (read pointer) of the access unit to obtain the corresponding presentation time stamp and thereby the requested decoding time. Decoding and presentation are synchronized by comparing the requested decoding time with the system clock time.

If the requested decoding time is later than the system clock time by more than one presentation (frame) time period for the corresponding presentation unit, presentation of the presentation unit is skipped. If the requested decoding time is earlier than the system clock time by more than the presentation time period, presentation of the presentation unit is repeated.

The system further comprises a provision for synchronizing the system time clock (STC) using System Clock Reference (SCR) or Program Clock Reference (PCR) time stamps that are extracted from the bitstream.

More specifically, the present invention implements a loosely coupled video/audio synchronization scheme. It is designed to take into account unpredictable system delays such as externally generated video syncs, as well as easily deal with a variety of error conditions that may occur in the channel.

The system time clock (STC) is first set. In an MPEG 1 stream, the System Clock Reference (SCR) time stamp comes from the pack layer. In an MPEG 2 stream the Program Clock Reference (PCR) can come from various places, including the transport layer, the program stream pack header or the Program Elementary Stream (PES) layer.

In each case, the SCR or PCR is trapped by a system parser, stored in a system stream buffer, and an interrupt is generated. A host controller reads the SCR or PCR field and copies it to an SCR register, and sets the system clock timer counting. If interrupt latency is very long the SCR or PCR value can be adjusted to accommodate the latency.

The decoder is then started. The actual start is delayed until a vertical sync signal is generated in order to synchronize frame reconstruction and delay.

A host controller responds to each picture start code interrupt. It examines a video elementary stream buffer read pointer, and uses this value to associate the picture with a list of pending presentation time stamps stored in a system header buffer. The error between the actual presentation time (the current system clock time) and the requested presentation time (from the presentation time stamp) can then be determined.

One of three actions is taken depending on the magnitude and sense of the error.

1. If the error is less than one presentation frame time, the audio or video frame is synchronized to the system time clock, and is decoded as scheduled.

2. If the actual presentation time is earlier than the requested presentation time by more than one presentation time period, the decoder repeats one presentation unit (frame).

3. If the actual presentation time is later the requested presentation time by more than one presentation time period, the decoder skips a frame.

This process is repeated indefinitely. If the decoder loses synchronization for any reason, an appropriate corrective action is taken.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is block diagram illustrating a video/audio decoding system embodying the present invention;

FIG. 2 is a simplified diagram illustrating a data bitstream that is decoded by the system of FIG. 1;

FIG. 3 is a more detailed block diagram of the present decoding system;

FIG. 6 is a flowchart illustrating the steps of storing a presentation time stamp and associated memory pointer tag;

FIG. 7 is a flowchart illustrating a decoding operation;

FIG. 8 is a flowchart illustrating the synchronization of presentation of a data frame;

FIG. 9 is a flowchart illustrating synchronization of system clock time;

DETAILED DESCRIPTION OF THE INVENTION

Figure 4:
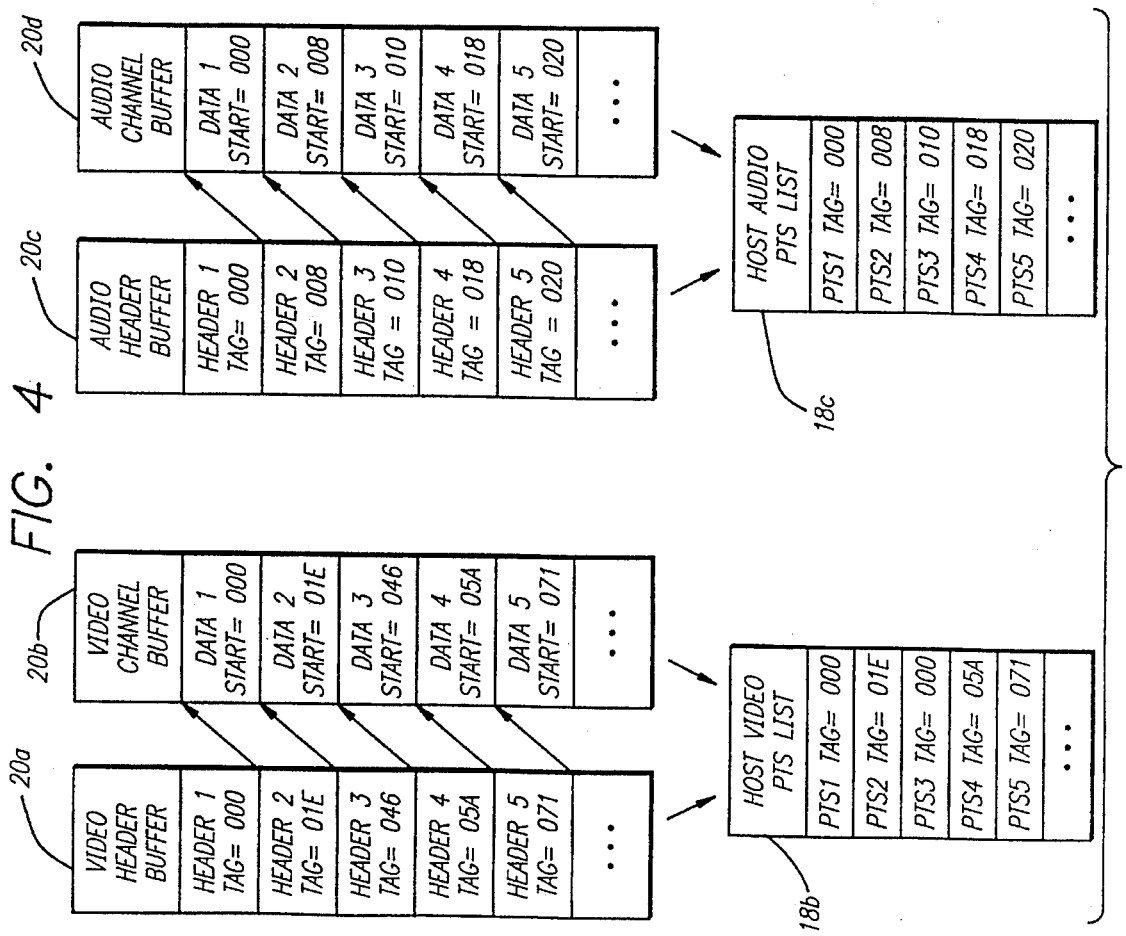
FIG. 4 is a diagram illustrating an arrangement of buffer memories of the present system.

A video/audio decoder system 10 embodying the present invention is illustrated in FIG. 1, and comprises a demodulator/ECC/decryption unit 12 for receiving an MPEG multiplexed bitstream from an encoder (not shown) via a communications channel 14. The unit 12 demodulates the input bitstream, performs error correction (ECC) and de-encrypts the demodulated data if it is encrypted for access limitation or data compression purposes.

The unit 12 applies the demodulated MPEG bitstream as digital data to a video/audio decoder 16, which de-multiplexes and decodes the bitstream to produce output video and audio signals in either digital or analog form.

The system 10 further comprises a host microcontroller 18 that interacts with the decoder 16 via an arrangement of interrupts as will be described in detail below. The decoder 16 and the microcontroller 18 have access to an external data storage such as a Dynamic Random Access Memory (DRAM) 20. It will be noted that the scope of the invention is not so limited, however, and that the memory 20 can be provided inside the decoder 16 or the microcontroller 18.

A simplified, generic representation of an MPEG bitstream is illustrated in FIG. 2. The bitstream includes a system header that provides housekeeping and other information required for proper operation of the decoder 16. A pack header identifies a pack of data that comprises one or more packs, with each pack having a pack header. Each pack includes one or more video and/or audio access units (encoded frames), each of which is preceded by its own header having a frame Start Code (SC).

The MPEG system syntax governs the transfer of data from the encoder to the decoder. A system stream typically comprises a number of Packetized Elementary Streams (PES), which can be video or audio streams, that are combined together to form a program stream. A program is defined as a set of elementary streams which share the same system clock reference, so can be decoded synchronously to each other.

In MPEG 1 there are only two levels of hierarchy in the system syntax; the elementary stream and the program stream. In MPEG 2 there are more levels.

| MPEG 1 | MPEG 2 |
| --- | --- |
| Program Stream Stream (PES) | Transport Stream or Program Program Elementary Stream |
| Elementary Stream | Elementary Stream |

The Program Elementary Stream (PES) is introduced to allow multiple programs to be sent over the same transport stream. An MPEG 2 system may either transmit a program stream, containing a PES for a single program, or a transport stream, containing PESs for multiple, possibly unrelated, programs. An MPEG 2 system decoder therefore must be able to accept PES data from transport packets or from the program stream.

The crucial difference between these two scenarios is that the data in transport packets may split PES packets at non-packet boundaries, whereas the data in a program stream will only switch from one PES to another at PES boundaries.

The present system 10 parses MPEG 1 and MPEG 2 system data in the same way, using a system parser between the incoming system data and elementary stream buffers.

As illustrated in FIG. 3, the microcontroller 18 comprises a Random Access Memory (RAM) 18a for storing a list of memory pointer tag entries as will be described in detail below. The decoder 16 comprises a pre-parser 22, a post-parser 24, a video decoder 26, an audio decoder 28, a video presentation unit 30, an audio presentation unit 32. A channel controller 34 controls the operation of the units 22 to 32.

The units 22 to 28 and 34 have access to the DRAM 20 via a bus 36. The DRAM 20 is preferably a single continuous block of memory, but is internally partitioned into a video header buffer 20a, a video channel (data) buffer 20b, an audio header buffer 20c, an audio channel (data) buffer 20d and a frame memory buffer 20e.

The pre-parser 22 parses the input bitstream and captures any SCR (MPEG 1) or PCR (MPEG 2) time stamps that are included in any of the layers of the stream. The pre-parser 22, under control of the channel controller 34, causes PES video headers to be stored in the video header buffer and PES audio headers to be stored in the audio header buffer 20c.

The pre-parser 22 causes PES streams of video data (access) units to be stored in the video channel buffer 20b and audio data (access) units to be stored in the audio channel buffer 20d in a First-In-First-Out (FIFO) arrangement. The starting address of each access unit stored in the buffer 20b or 20d is the address following the last address of the previous access unit.

Figure 5:
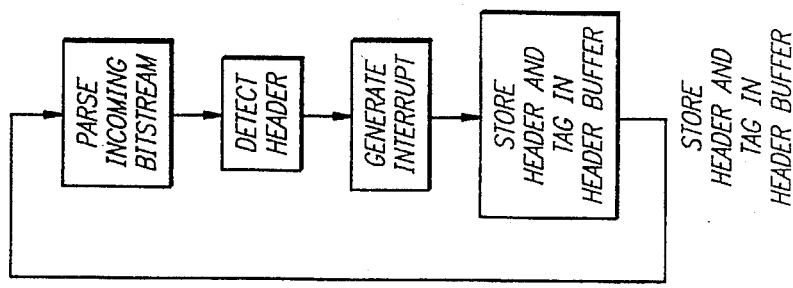
FIG. 5 is a flowchart illustrating the steps of storing a data header and associated memory tag in accordance with the present invention.

The operation of the pre-parser 22 is illustrated in flowchart form in FIG. 5. The parsing operation for video and audio data is essentially similar.

As the pre-parser 22 begins to store a video header or an audio header in the header buffer 20a or 20c respectively, it generates a first interrupt to the microcontroller 18. The pre-parser 22 then stores the access unit following the header in the appropriate channel buffer 20b or 20d. The pre-parser 22 also captures the starting address (write pointer) of the access unit in the channel buffer 20b or 20d, and appends this starting address as a "tag" to the header stored in the header buffer 20a or 20c.

As illustrated in the flowchart of FIG. 6, the host microcontroller 18 receives the first interrupt from the pre-parser 22, and extracts the presentation time stamp from the PES header stored in the header buffer 20a or 20c, together with the associated tag. The host microcontroller 18 stores these two items as an "entry" in a list in the RAM 18a. The entries in the RAM 18a provide a link between the presentation time stamps stored in the header buffer 20a or 20c and the starting addresses of the associated access units stored in the channel buffer 20b or 20d.

FIG. 4 illustrates a simplified example of five video access units and five audio access units stored in the DRAM 20, and the associated entries in the list in the RAM 18a. The headers for the five video access units stored in the video header buffer 20a include the presentation time stamps for the access units, although not explicitly illustrated. The associated tags for the five video headers indicate the starting addresses for the five video access units stored in the video channel buffer 20b, in the illustrated example hexadecimal addresses 000, 01E, 046, 05A and 071 respectively.

In an essentially similar manner, the headers for the five audio access units stored in the audio header buffer 20c include the presentation time stamps for the access units. The associated tags for the five audio headers indicate the starting addresses for the five audio access units stored in the audio channel buffer 20d, in the illustrated example hexadecimal addresses 000, 008, 010, 018 and 020 respectively.

The tag list in the RAM 18a of the microcontroller 18 includes a video tag list 18b and an audio tag list 18c. Each entry includes the presentation time stamp for the associated video or audio access unit and the tag or starting address for the access unit stored in the buffer 20b or 20c respectively.

The video and audio access units are decoded asynchronously relative to the operation of the pre-parser 22 by the decoders 26 and 28 respectively. The decoders 26 and 28 read access units out of the channel buffers 20b and 20d in synchronism with frame start pulses generated by the presentation controllers 30 and 32 respectively.

The video and audio presentation units (decoded access units or frames) are presented at a fixed frame rate, typically 30 frames/second for video. The access units are not decoded and presented instantaneously as in the idealized MPEG Standard Target Decoder (STD) model, but are presented at a fixed time interval after the start of decoding. This interval is typically 1.5 frames for video.

Thus, the requested decoding time can be calculated indirectly from the presentation time stamp by subtracting the fixed time interval from the value of the presentation time stamp. If the system is designed to also utilize Decoding Time Stamps (DTS), the desired decoding time is equal to the DTS and can be obtained directly from the bitstream without using the PTS.

The decoding operation is illustrated in the flowchart of FIG. 7. Upon receipt of a frame start pulse from the controller 30 or 32, the decoder 26 or 28 starts to decode the next access unit in the buffer 20b or 20d. Upon reading a Start Code (SC), which indicates the beginning of the associated access unit, the decoder 26 or 28 generates a second interrupt, and continues to decode the remainder of the access unit and apply the decoded presentation unit to the controller 30 or 32 for presentation on a user's television monitor or the like.

The post-parser 24, under control of the channel controller 34, causes video and audio access units to be read out of the DRAM 20 and applied to the appropriate decoder 26 or 28.

The operation of synchronizing the decoding, presentation of video and audio data in accordance with the present invention is illustrated in FIG. 8. In response to a second interrupt, the host microcontroller 18 captures the starting address (read pointer) of the access unit being decoded in the buffer 20b or 20d, and uses this value to access the list 18b or 18c in the RAM 18a. The microcontroller 18 searches the appropriate list 18b or 18c until it finds the highest value tag that is larger than the captured read pointer. This is the tag of the access unit being decoded. The other portion of the entry for this tag is the presentation time stamp of the access unit being decoded.

As illustrated in FIG. 3, the decoder 16 further comprises a System Time Clock (STC) counter 38 that is incremented by a 90 kHz clock pulse generator 40. The instantaneous count of the counter 38 constitutes the system clock time which constitutes a time reference for synchronizing the decoding and presentation operations of the system 10.

The host microcontroller 18, in response to a second interrupt, captures the count of the counter 38 and compares it with the value of the presentation time stamp minus the fixed time interval between decoding and presentation. This latter value represents the requested decoding time, or the system clock time at which the associated access unit should be decoded. If a Decoding Time Stamp (DTS) is provided, the DTS is equal to the PTS minus the fixed decoding time interval, and can be used instead of the PTS.

If the requested decoding time is less than one frame time interval different from the count of the counter 38 (system clock time), the data unit is decoded and presented in the normal manner. If, however, the requested decoding time differs from the system clock time by more than one frame time interval, indicating that the system 10 is out of synchronization by more than one frame, a synchronization adjustment is made.

If the requested decoding time is larger than the system clock time, indicating that the associated access unit is being decoded too soon, presentation of the frame is repeated to add one frame time to the presentation operation. Conversely, if the requested decoding time is smaller than the system time, indicating that the access unit is being decoded too late, decoding and presentation of the access unit are skipped to subtract one frame time from the presentation.

The channel buffers 20b and 20d are FIFO or circular buffers, and are accessed using binary read and write addresses. Preferably, the decoder 26 or 28 appends one or more Most Significant Bits (MSB) to the starting addresses or tags stored in the tag lists 18b and 18c which indicate the number of times the buffer 20b or 20d has rolled over. This enables the host microcontroller 18 to search the tag lists over a substantial number of frames to determine the correct association in the event that the system 10 gets out of synchronization by more than one frame.

The system 10 is further provided with a means for initially setting the system clock time in the counter 38, and adjusting the system clock time to compensate for discrepancies between the system clock time and requested system time clock (STC) times provided by SCR or PCR time stamps in the MPEG bitstream. These discrepancies are caused by system errors, deviations in the frequency of the clock pulse generator 40 from the nominal value of 90 kHz, or various other factors.

The system clock time is first set to an initial value. In response to a first interrupt from the pre-parser 22 which results from storing a PES header in the header buffer 20a or 20c, the microcontroller 18 reads the counter 38 to obtain a value SCR0. When an SCR or PCR is parsed from the transport layer, or decoded from a PES header, the pre-parser 22 extracts this value as SCR1. SCR0 represents the current system clock time at the time the SCR or PCR (SCR1) is obtained, with a negligible error. Thus, an error between the actual and requested values of the system clock time is represented as err=SCR1−SCR0.

After decoding the PES header, the microcontroller 18 reads the value of the counter 38 to obtain a value SCR2, and causes a new value to be set into the counter 38 which is equal to SCR2+err=SCR2+(SCR1−SCR0), and is compensated for the time required to decode the header.

Figure 10:
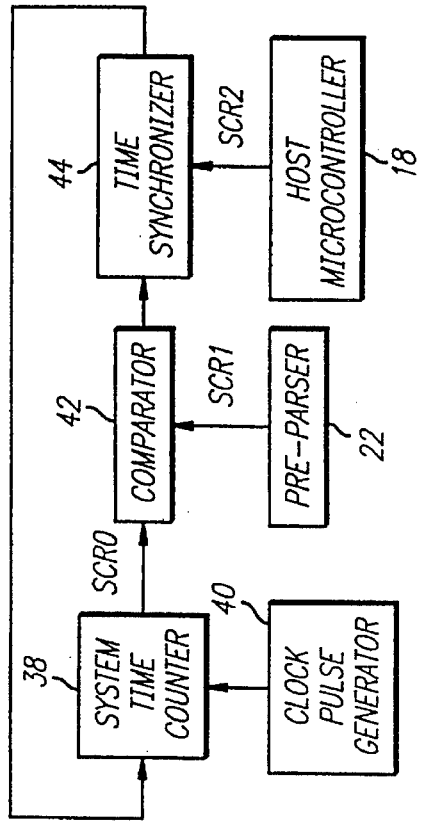
FIG. 10 is a block diagram illustrating a first arrangement for synchronizing the system clock time.

This operation is embodied as illustrated in FIG. 10, in which the system 10 further comprises a comparator 42 for comparing SCR0 with SCR1, and a time synchronizer 44 for adding (SCR1−SCR0) to SCR2 and setting this value into the counter 38. If desired, the functions of the comparator 42 and the synchronizer 44 can be incorporated into the microcontroller 18 in software. This same synchronization method can be used to re-synchronize the counter 38 to subsequently received SCRs or PCRs.

Figure 11:
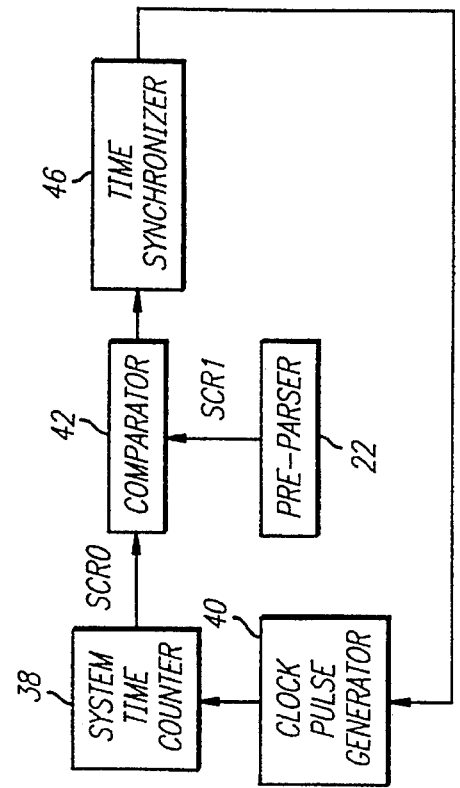
FIG. 11 is a block diagram illustrating a second arrangement for synchronizing the system clock time.

FIG. 11 illustrates another arrangement by which the system clock time can be adjusted by varying the frequency of the clock pulse generator 40. Typically, the generator 40 will include a voltage controller oscillator (not shown) or other means by which the frequency of the generator 40 can be varied in a controlled manner.

If err=SCR1−SCR0>0, indicating that the count of the counter (system clock time) is behind the system time represented by the system time stamp (SCR or PCR) a time synchronizer 46 controls the generator 40 to increase the frequency of the clock pulses by a suitable amount and thereby speed up the system time clock (STC). Conversely, if err=SCR1−SCR0<0, indicating that the count of the counter (system clock time) is ahead of the system time represented by the system time stamp (SCR or PCR) a time synchronizer 46 controls the generator 40 to decrease the frequency of the clock pulses and thereby speed up the system time clock (STC).

Various modifications will become possible for those skilled in the art after receiving the teachings of the present disclosure without departing from the scope thereof.

We claim:

1. A decoding system for decoding a data stream:
    the data stream comprising:
        an encoded data unit;
        a header corresponding to said encoded data unit; and
        a time stamp included in said header for indicating a requested decoding time for said encoded data unit;
    the system comprising:
        a header memory;
        a data memory;
        a list memory;
        parsing means for parsing said data stream, storing said header in the header memory, storing said encoded data unit in the data memory beginning at a starting address and capturing said time stamp;

computing means responsive to said parsing by the parsing means for storing said time stamp and said starting address as a list entry in said list memory; and decoding means for reading and decoding said encoded data unit from the data memory at an actual decoding time which can differ from said requested decoding time to produce a decoded data unit;

the computing means being further responsive to said reading and decoding by the decoding means for accessing said list entry in the list memory using said starting address to obtain said time stamp;

wherein the relationship between said requested decoding time and said actual decoding time can be utilized to synchronize subsequent presentation of said decoded data unit.

2. A system as in claim 1, further comprising:

system timer means for maintaining a system clock time; and comparator means for comparing said time stamp with a current value of said system clock time which constitutes said actual decoding time from the system timer means when the decoder means begins to read and decode said encoded data unit.

3. A system as in claim 1, in which:

the data memory comprises a circular buffer; and the parsing means appends a value indicating a number of times the circular buffer has rolled over to the starting address for storing in the list memory.

4. A system as in claim 3, in which:

said starting address is a binary number; and the parsing means appends said value to said binary number as a predetermined number of most significant bits.

5. A system as in claim 1, in which:

said data stream further comprises a system time stamp; and the system further comprises:

system timer means for maintaining a system clock time;

comparator means for comparing said system time stamp to a current value of said system clock time; and synchronization means for adjusting the system timer means such that said current value of said system clock time becomes substantially equal to said system time stamp.

6. A system as in claim 5, in which the synchronization means adjusts the system timer means by resetting said system clock time to a value that is based on said system time stamp.

7. A system as in claim 5, in which:

the system timer means comprises:

a clock pulse generator; and a counter that is clocked by the clock pulse generator such that said system clock time is constituted by a count of the counter; and the synchronization means adjusts the system timer means by altering a frequency of the clock pulse generator.

8. A system as in claim 1, in which:

the parsing means generates a first interrupt upon storing said header in said header memory;

the computing means stores said time stamp and said starting address as a list entry in said list memory in response to said first interrupt;

the decoding means generates a second interrupt upon beginning of reading and decoding said encoded data unit at said actual decoding time; and the computing means accesses said list entry in the list memory using said starting address to obtain said time stamp in response to said second interrupt.

9. A decoding system for decoding a data stream:

the data stream comprising:

an encoded data unit;

a header corresponding to said encoded data unit; and a time stamp included in said header for indicating a decoding time for said encoded data unit;

the system comprising:

a header memory;

a data memory;

a list memory;

parsing means for parsing said data stream, storing said header in the header memory, storing said encoded data unit in the data memory beginning at a starting address and capturing said time stamp;

computing means responsive to said .parsing by the parsing means for storing said time stamp and said starting address as a list entry in said list memory;

decoding means for reading and decoding said encoded data unit from the data memory to produce a decoded data unit;

the computing means being further responsive to said reading and decoding by the decoding means for accessing said list entry in the list memory using said starting address to obtain said time stamp;

system timer means for maintaining a system clock time;

comparator means for comparing said time stamp with a current value of said system clock time from the system timer means when the decoder means begins to read and decode said encoded data unit;

presentation means for presenting said decoded data unit; and synchronization means for controlling the presentation means to repeat presentation of said decoded data unit if said time stamp exceeds said current value of said system clock time by more than a first predetermined value; and controlling the presentation means to skip presentation of said decoded data unit if said current value of said system clock time exceeds said time stamp by more than a second predetermined value.

10. A system as in claim 9, in which:

the presentation means begins to present said decoded data unit at a predetermined time interval after the decoder means begins to decode said encoded data unit;

said time stamp indicates said presentation time directly, and thereby indicates said decoding time indirectly as being equal to said presentation time minus said predetermined time interval; and the synchronization means determines said decoding time by subtracting said predetermined time interval from said time stamp.

11. A system as in claim 10, in which:

said data stream is an MPEG bitstream; and said time stamp is a presentation time stamp.

12. A system as in claim 9, in which said first predetermined value is equal to said second predetermined value.

13. A system as in claim 12, in which:

said decoded data unit is a video frame; and said first and second predetermined values are substantially equal to a frame presentation rate.

14. A decoder for decoding a data stream:

the data stream comprising:
- an encoded data unit; and
- a header corresponding to said encoded data unit;

the decoder comprising:
- a header memory;
- a data memory;
- parsing means for parsing said data stream, storing said header in the header memory, storing said encoded data unit in the data memory, and generating a first interrupt upon storing said header in the header memory; and
- decoding means for reading and decoding said encoded data unit from the data memory to produce a decoded data unit, and generating a second interrupt upon beginning of reading and decoding said encoded data unit; in which the data stream further comprises a time stamp included in said header for indicating a requested decoding time for said encoded data unit;

the parsing means further captures and stores said time stamp; and the decoder further comprises:
- system timer means for maintaining a system clock time; and
- comparator means for reading and comparing said time stamp with a current value of said system clock time which constitutes an actual decoding time from the system timer means when the decoder means begins to read and decode said encoded data unit.

15. A decoder as in claim 14, in which:

said data stream further comprises a system time stamp; and the decoder further comprises:
- system timer means for maintaining a system clock time;
- comparator means for comparing said system time stamp to a current value of said system time; and
- synchronization means for adjusting the system timer means such that said current value of said system clock time becomes substantially equal to said system time stamp.

16. A decoder as in claim 15, in which the synchronization means adjusts the system timer means by resetting said system clock time to a value that is based on said system time stamp.

17. A decoder as in claim 16, in which:

the system timer means comprises:
- a clock pulse generator; and
- a counter that is clocked by the clock pulse generator such that said system clock time is constituted by a count of the counter; and the synchronization means adjusts the system timer means by altering a frequency of the clock pulse generator.

18. A decoder for decoding a data stream:

the data stream comprising:
- an encoded data unit; and
- a header corresponding to said encoded data unit;..

the decoder comprising:
- a header memory;
- a data memory;
- parsing means for parsing said data stream, storing said header in the header memory, storing said encoded data unit in the data memory, and generating a first interrupt upon storing said header in the header memory; and
- decoding means for reading and decoding said encoded data unit from the data memory to produce a decoded data unit, and generating a second interrupt upon beginning of reading and decoding said encoded data unit;

the data stream further comprising a time stamp included in said header for indicating a decoding time for said encoded data unit;

the parsing means further capturing said time stamp;
- system timer means for maintaining a system clock time;
- comparator means for comparing said time stamp with a current value of said system clock time from the system timer means when the decoder means begins to read and decode said encoded data unit;
- presentation means for presenting said decoded data unit; and
- synchronization means for controlling the presentation means to repeat presentation of said decoded data unit if said time stamp exceeds said current value of said system clock time by more than a first predetermined value; and controlling the presentation means to skip presentation of said decoded data unit if said current value of said system clock time exceeds said time stamp by more than a second predetermined value.

19. A decoder as in claim 18, in which:

the presentation means begins to present said decoded data unit at a predetermined time interval after the decoder means begins to decode said encoded data unit;

said time stamp indicates said presentation time directly, and thereby indicates said decoding time indirectly as being equal to said presentation time minus said predetermined time interval; and the synchronization means determines said decoding time by subtracting said predetermined time interval from said time stamp.

20. A decoder as in claim 19, in which:

said data stream is an MPEG bitstream; and said time stamp is a presentation time stamp.

21. A decoder as in claim 18, in which said first predetermined value is equal to said second predetermined value.

22. A decoder as in claim 21, in which:

said decoded data unit is a video frame; and said first and second predetermined values are substantially equal to a frame presentation rate.

23. A method of decoding a data stream:

the data stream comprising:
- an encoded data unit;
- a header corresponding to said encoded data unit; and
- a time stamp included in said header for indicating a requested decoding time for said encoded data unit;

the method comprising the steps of:
(a) parsing said data stream;
(b) storing said header in a header memory;
(c) storing said encoded data unit in a data memory beginning at a starting address;
(d) capturing said time stamp;
(e) storing said time stamp and said starting address as a list entry in a list memory;
(f) reading and decoding said encoded data unit from the data memory at an actual decoding time which can differ from said requested decoding time to produce a decoded data unit; and (g) accessing said list entry in the list memory using said starting address to obtain said time stamp;

wherein the relationship between said requested decoding time and said actual decoding time can be utilized to synchronize subsequent presentation of said decoded data unit.

24. A method as in claim 23, further comprising the steps of:

(h) maintaining a system time; and (i) comparing said time stamp with a current value of said system clock time which constitutes said actual decoding time from the system timer means upon performing step (f).

25. A method as in claim 23, in which:

step (b) further comprises generating a first interrupt;

step (e) comprises storing said time stamp and said starting address as a list entry in said list memory in response to said first interrupt;

step (f) comprises generating a second interrupt upon beginning of reading and decoding said encoded data unit; and step (g) comprises accessing said list entry in the list memory using said starting address to obtain said time stamp in response to said second interrupt.

26. A method of decoding a data stream:

the data stream comprising:

an encoded data unit;

a header corresponding to said encoded data unit; and a time stamp included in said header for indicating a decoding time for said encoded data unit;

the method comprising the steps of:

(a) parsing said data stream;

(b) storing said header in a header memory;

(c) storing said encoded data unit in a data memory beginning at a starting address;

(d) capturing said time stamp;

(e) storing said time stamp and said starting address as a list entry in a list memory;

(f) reading and decoding said encoded data unit from the data memory to produce a decoded data unit; and (g) accessing said list entry in the list memory using said starting address to obtain said time stamp;

(h) maintaining a system time;

(i) comparing said time stamp with a current value of said system clock time from the system timer means upon performing step (f);

(j) repeating presentation of said decoded data unit if said time stamp exceeds said current value of said system clock time by more than a first predetermined value; and (k) skipping presentation of said decoded data unit if said current value of said system clock time exceeds said time stamp by more than a second predetermined value.

* * * * *